(12) United States Patent
Berscheit et al.

(10) Patent No.: US 7,606,002 B1
(45) Date of Patent: Oct. 20, 2009

(54) OFFSET DIMPLE IN A DISK DRIVE WITH HEAD SUSPENSION FLEXURE EXTENDING INTO LOAD BEAM OFFSET APERTURE

(75) Inventors: Gary J. Berscheit, Watertown, MN (US); Joel B. Douglas, Hutchinson, MN (US); Shawn P. Henze, Delano, MN (US); Ryan D. Kariniemi, Cokato, MN (US); Mark M. Kiviahde, Buffalo, MN (US); Duane A. Lundin, Litchfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 655 days.

(21) Appl. No.: 11/441,966

(22) Filed: May 26, 2006

Related U.S. Application Data

(60) Provisional application No. 60/684,936, filed on May 26, 2005.

(51) Int. Cl.
*G11B 5/55* (2006.01)
(52) U.S. Cl. .................................... 360/245.1; 360/245
(58) Field of Classification Search ....... 360/245–245.2
See application file for complete search history.

(56) References Cited

U.S. PATENT DOCUMENTS

| | | | |
|---|---|---|---|
| 4,819,094 A | 4/1989 | Oberg | |
| 5,386,331 A | 1/1995 | Wolter | |
| 5,519,552 A | 5/1996 | Kohira et al. | |
| 5,537,274 A | 7/1996 | Imasaki | |
| 5,680,274 A | 10/1997 | Palmer | |
| 5,790,347 A | 8/1998 | Girard | |
| 5,802,409 A | 9/1998 | Brock et al. | |
| 5,850,320 A | 12/1998 | Warmka et al. | |
| 5,862,017 A | 1/1999 | Kohira et al. | |
| 5,912,787 A | 6/1999 | Khan et al. | |
| 5,912,788 A | 6/1999 | Blaeser et al. | |
| 6,078,470 A | 6/2000 | Danielson et al. | |

(Continued)

FOREIGN PATENT DOCUMENTS

EP 911812 4/1999

(Continued)

OTHER PUBLICATIONS

"Partial Etch or Channel Forming to Protect Trace and Reduce the Height," Research Disclosure, Feb. 1999, 1 pg.
"Hutchinson Technology® coined pocket and trench innovation for Unamount™ and E-Block arms," Research Disclosure, Jul. 2000, 1 pg.

*Primary Examiner*—A. J. Heinz
(74) *Attorney, Agent, or Firm*—Faegre & Benson LLP

(57) ABSTRACT

A disk drive head suspension, including a load beam formed from one or more layers of material, and a flexure mounted to the load beam. The load beam has an offset aperture and stiffening rails, and is characterized by a Z-height dimension between the one or more layers of material and the free end edges of the stiffening rails. The flexure has a slider-receiving region extending at least partially through the offset aperture and located within the Z-height dimension of the load beam. A load point structure is provided on the load beam and/or the flexure for restraining movement of the slider receiving region and for permitting slider-receiving region to pivot in under aerodynamic forces.

14 Claims, 8 Drawing Sheets

U.S. PATENT DOCUMENTS

| | | |
|---|---|---|
| 6,288,877 B1 | 9/2001 | Khan et al. |
| 6,501,623 B1 | 12/2002 | Sassolini et al. |
| 6,522,624 B2 | 2/2003 | Budde |
| 6,898,841 B2 * | 5/2005 | Shiraishi .................. 29/603.04 |
| 7,006,333 B1 | 2/2006 | Summers |
| 2004/0032695 A1 | 2/2004 | Sassine et al. |
| 2004/0047078 A1 | 3/2004 | Budde et al. |

FOREIGN PATENT DOCUMENTS

| | | |
|---|---|---|
| EP | 0977180 A1 | 2/2000 |
| JP | 01-107384 | 4/1989 |
| JP | 07-254246 | 10/1995 |
| JP | 10-149646 | 6/1998 |
| JP | 2002288923 A2 | 10/2002 |
| KR | 102002008507 | 1/2002 |

* cited by examiner

OFFSET DIMPLE IN A DISK DRIVE WITH HEAD SUSPENSION FLEXURE EXTENDING INTO LOAD BEAM OFFSET APERTURE

REFERENCE TO RELATED APPLICATIONS

This application claims the benefit of U.S. Provisional Patent Application 60/684,936, filed May 26, 2005, and entitled "Offset Dimple Disk Drive Head Suspension," which is incorporated herein by reference in its entirety.

FIELD OF THE INVENTION

The present invention relates generally to disk drive head suspensions. In particular, the present invention is a dimple or load point structure for disk drive head suspensions.

BACKGROUND OF THE INVENTION

Magnetic disk drives include a rotating disk for storing information in small magnetized domains strategically located on the disk surface. A magnetic read/write head is typically provided as part of a "head slider" and positioned in close proximity to the rotating disk for creating and reading the magnetic domains. The head slider is supported and properly oriented in relationship to the disk by a head suspension assembly. As the disk in the storage device rotates beneath the head slider and head suspension, the air above the disk similarly rotates, thus creating an air bearing which acts with an aerodynamic design of the head slider to create a lift force on the head slider. The lift force is counteracted by the head suspension.

Typical head suspensions include a load beam and a flexure. The load beam normally includes, in part, a proximal mounting region for mounting the load beam to an actuator arm of the disk drive, and a rigid distal region to which the flexure can be mounted for supporting the head slider. The rigid region of the load beam also typically includes stiffening rails. The flexure can be either integral with the load beam or formed as a separate piece which is rigidly mounted on the load beam using conventional approaches such as spot welds. The flexure includes a slider receiving member or tongue to which the head slider is mounted, and is designed such that the tongue is resiliently moveable with respect to the remainder of the flexure in response to the aerodynamic forces generated by the air bearing.

In certain types of flexures, the tongue can pivot about a load point provided in either the load beam or the slider mounting region itself. Such load points commonly include a dimple, which provides clearance between the flexure tongue and the load beam and serves as a pivot point about which the head slider can pitch and/or roll in response to the aerodynamic forces generated by the air bearing. The load point dimple thus should provide sufficient clearance between the slider mounting tongue and the load beam to accommodate the pitch/roll motion of the tongue and slider.

The slider is typically positioned below the lower surface of the load beam. Thus, the overall height of the head suspension is the sum of the thicknesses of the slider, the tongue, and the dimple, and the height of the stiffening rails of the load beam. At the same time, however, miniaturization trends in magnetic disk drives require smaller and thinner head suspensions.

Thus, there is a need for disk drive head suspension having a reduced height and yet sufficient stiffness to counteract aerodynamic forces produced by the rotating disk.

SUMMARY OF THE INVENTION

The present invention is a disk drive head suspension having a reduced overall height as compared to conventional head suspensions in which a head slider is positioned below a lower surface of the load beam. In one embodiment, the head suspension comprises a load beam formed from one or more layers of material and including an offset aperture, and a flexure having a slider-receiving region. The flexure is mounted to the load beam with at least a portion of the slider receiving region extending into or through the offset aperture. The head suspension further includes a load point structure on the load beam and/or the flexure.

DETAILED DESCRIPTION OF THE PREFERRED EMBODIMENTS

Figure 1:
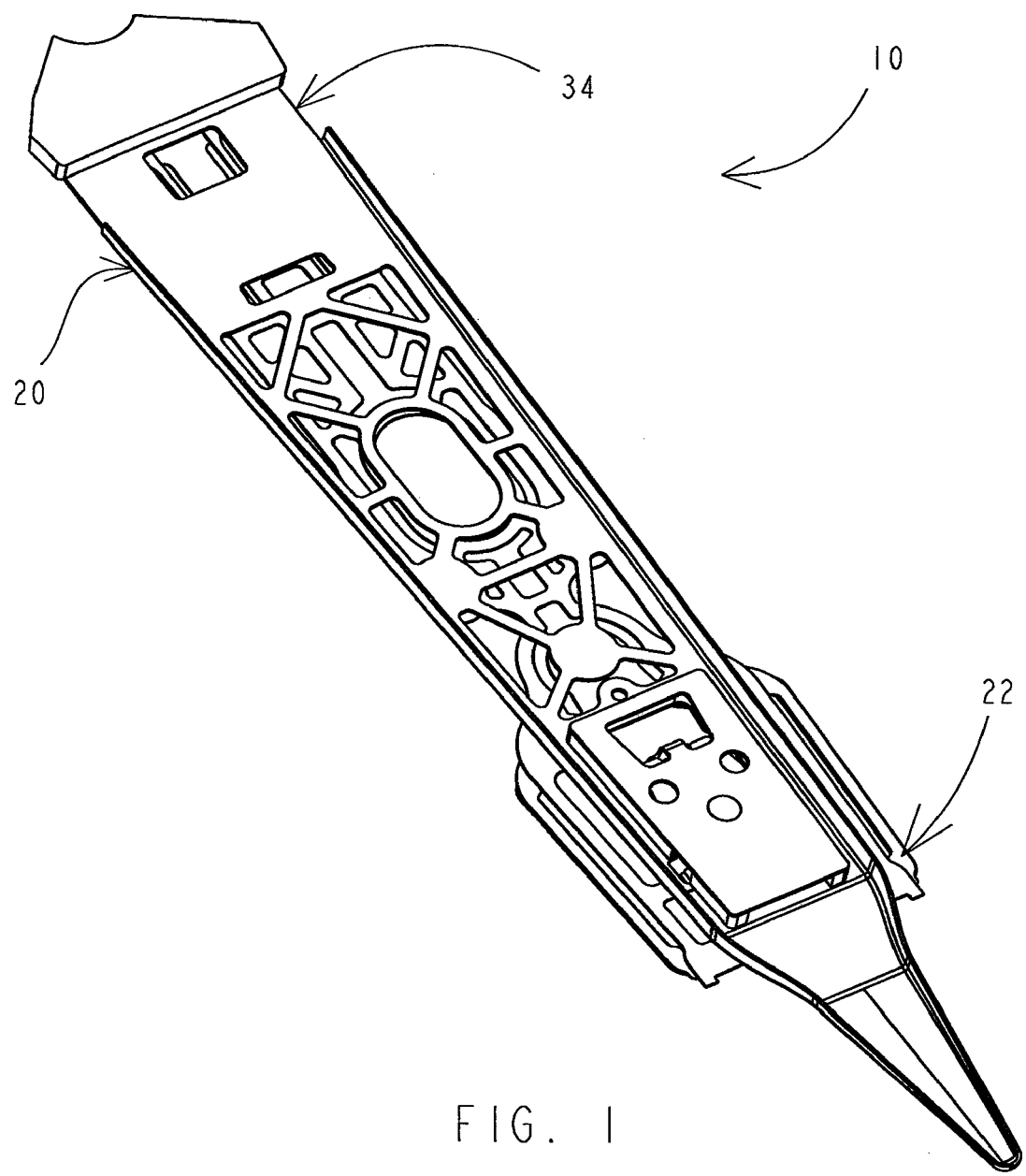
FIG. 1 is a perspective view of a disk drive head suspension according to one embodiment of the present invention.

FIGS. 1 and 2A-2E illustrate a disk drive head suspension 10 according to one embodiment of the present invention. As shown, the head suspension 10 includes a load beam 20 and a flexure 22 attached to a distal end of the load beam 20. A head slider 24 is mounted to a slider receiving region 26 of the flexure 22. As shown and discussed in detail below, the design of the illustrated embodiment advantageously reduces the overall height of the head suspension 10 as compared to conventional disk drive head suspension assemblies in which the slider mounting region or tongue is located below a lower surface of the load beam.

As illustrated, the load beam 20 includes a proximal mounting region 34 for mounting the load beam 20 to a rotary actuator of a disk drive (not shown). As further shown, the load beam 20 has a first side 38 and a second side 42, and a pair of longitudinal stiffening rails 46, 48 extending generally orthogonally from the first side 38 and terminating in free end edges 50, 52, respectively. As perhaps best seen in the cross-sectional view 2B-2B, the load beam 20 is characterized by a Z-height dimension Z, which in the illustrated embodiment corresponds to the height of the stiffening rails 46, 48.

In the illustrated embodiment, the load beam 20 further includes an offset aperture 60 through the first and second sides 38 and 42. In addition, a load point structure 64 is positioned over the offset aperture 60, and includes a load point pad 65 located between the stiffening rails 46, 48 within the Z-height dimension. As shown, the load point pad 65 includes a load point member 66, which is offset from the first side 38 by an offset member 68 connecting the load point member 66 to the load beam 20. The load point structure 64 further includes a load point, which in the illustrated embodiment is provided by a dimple 70 on the load point member 66 for pivotally engaging the slider receiving region 26 of the flexure 22. A limiter member 72 extends from a proximal end of the load point member 66 toward the offset aperture 60. In the illustrated embodiment, the offset member 68 is a generally "U" shaped structure positioned on the first side 38 so as to substantially surround a proximal and opposing lateral sides of the offset aperture 60.

As shown, the flexure 22 includes a base portion 76, a pair of laterally spaced flexure arms 80, 84 extending distally from the base portion 76, and a cross member 88 extending between the flexure arms 80, 84 at a distal end of the flexure 22. The base portion 76 is typically made relatively rigid for mounting the flexure 22 to the load beam 20. The slider receiving region 26 is positioned between and supported from the flexure arms 80, 84 by an offset structure, which in the illustrated embodiment includes a pair of mounting arms 94, 98 extending between the flexure arms 80, 84, respectively, and the slider receiving region 26. As shown, portions of the mounting arms 94, 98 are bent so as to position the slider receiving region 26 out of the general plane formed by the flexure arms 80, 84 and cross member 88. As further shown, the slider receiving region 26 includes a slider receiving surface 102 and a load point bearing surface 106 opposite the slider receiving surface 102 for engaging with the dimple 70 of the load point structure 64.

In the illustrated embodiment, the flexure 22 further includes a plurality of integrated leads 110 terminating in lead contact pads 114 positioned generally adjacent the slider receiving region 26. As shown, the leads 110 are supported by the flexure arms 80, 84 and the cross member 88, and are separated from the flexure arms and cross member by a dielectric layer 118. The leads 110 and lead contact pads 114 can be of any conventional design and materials used in integrated lead flexures (e.g., formed by either additive or subtractive processes).

In the assembled disk drive head suspension 10 (FIGS. 2C-2E), the base portion 76 of the flexure 22 is mounted to the second side 42 of the load beam 20 using any known method (e.g., soldering, spot welding) for attaching a flexure to a load beam. The head slider 24 is mounted on the slider receiving surface 102 of the slider receiving region 26, with terminal pads (not shown) of the slider 24 electrically coupled (e.g., by soldering) to respective lead contact pads 114. Mounting and attaching the head slider 24 to the slider receiving region 26 can be accomplished using any known methods or techniques (e.g., adhesives).

Figure 2A:
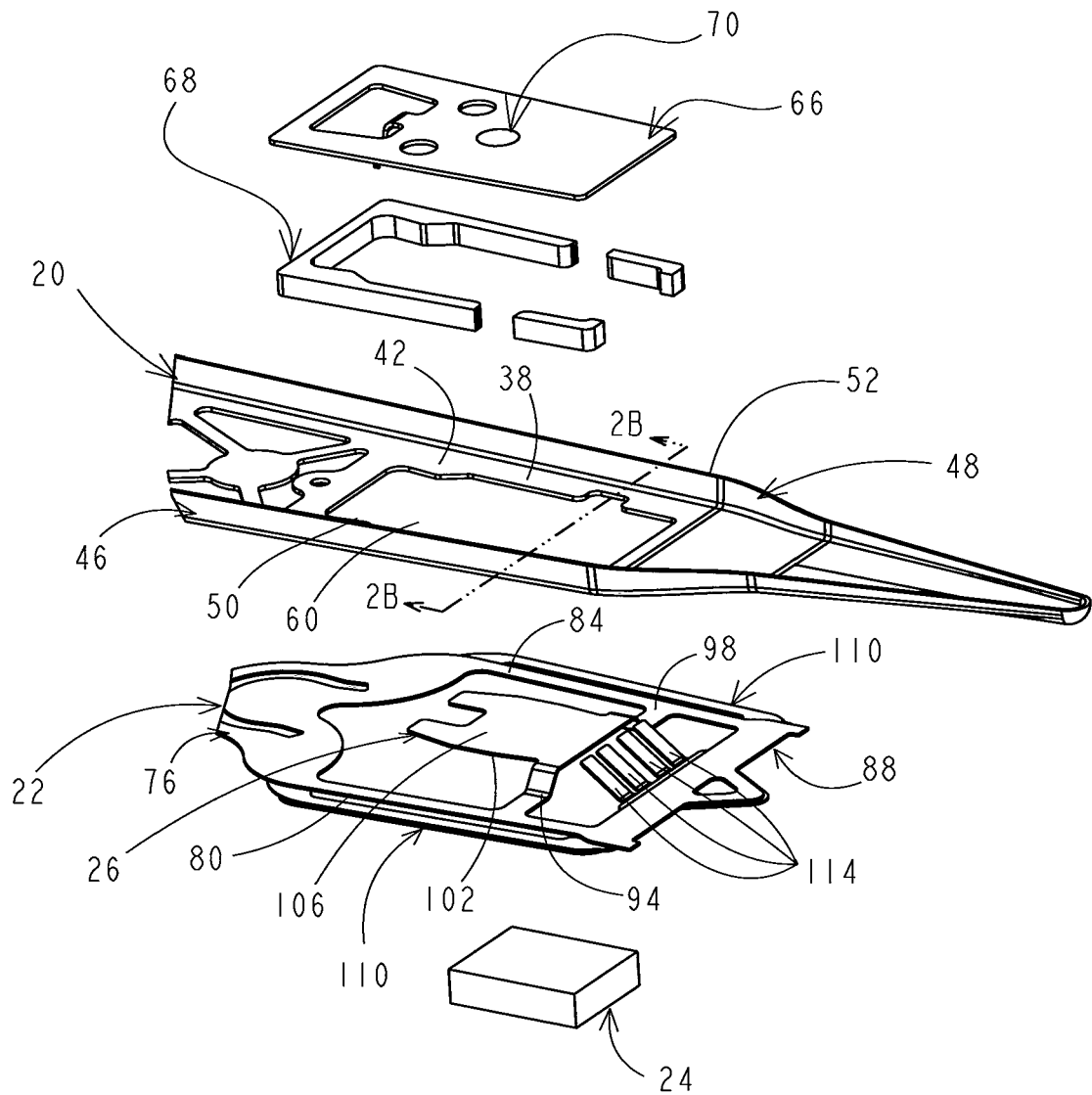
FIGS. 2A-2E illustrate a distal portion of the disk drive head suspension of FIG. 1.
Figure 2B:
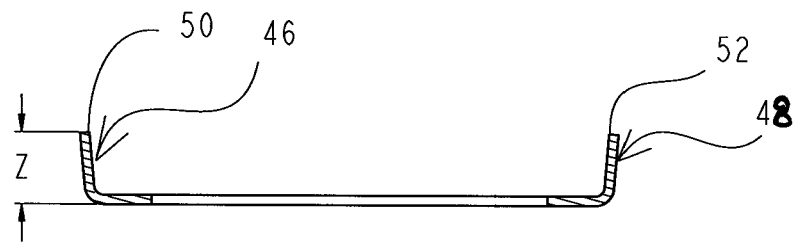
Figure 2C:
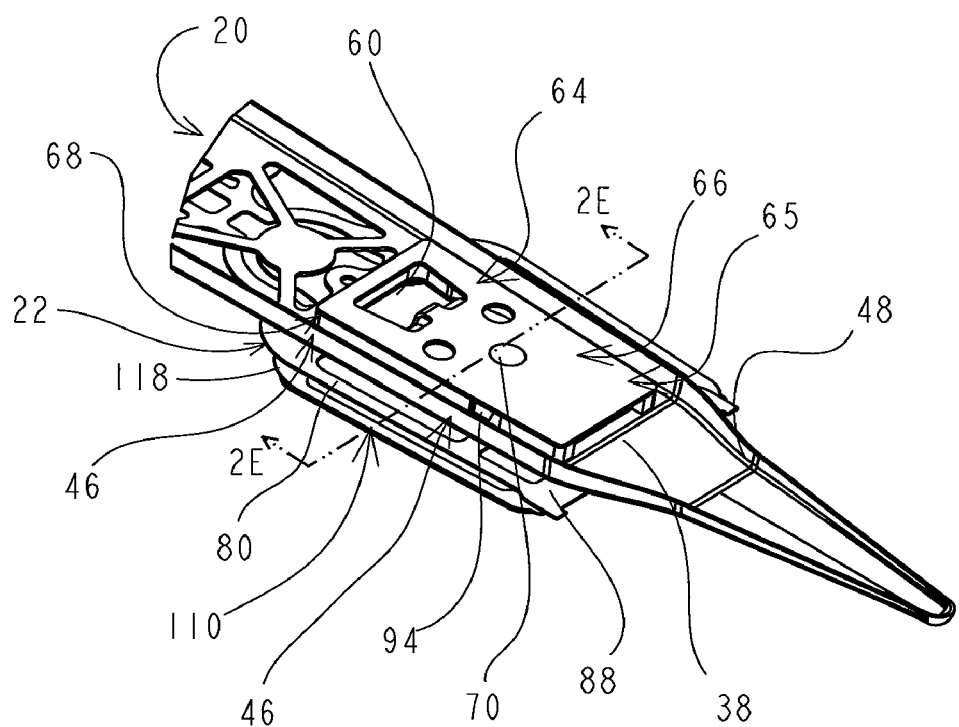
Figure 2D:
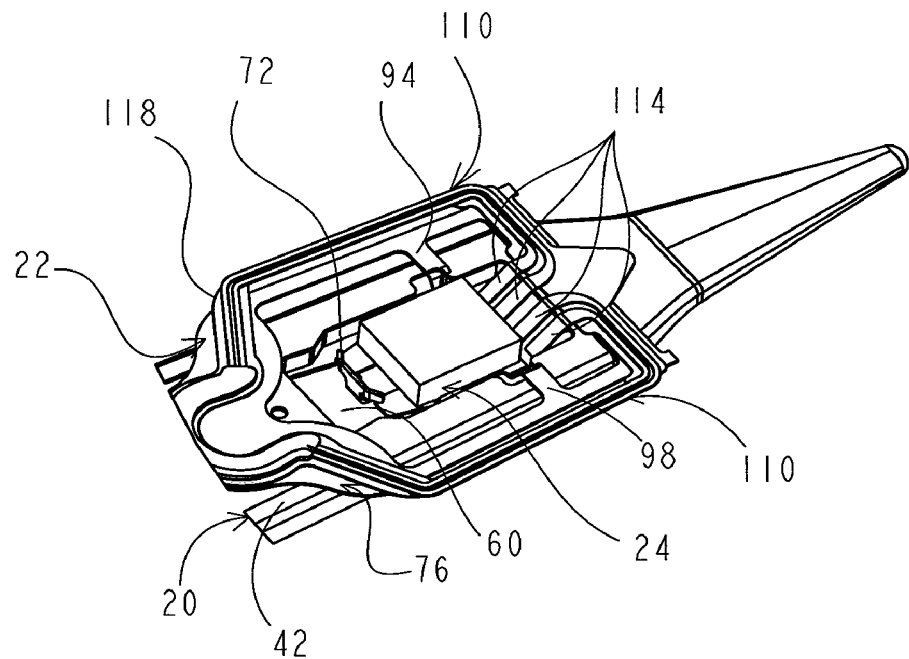
Figure 2E:
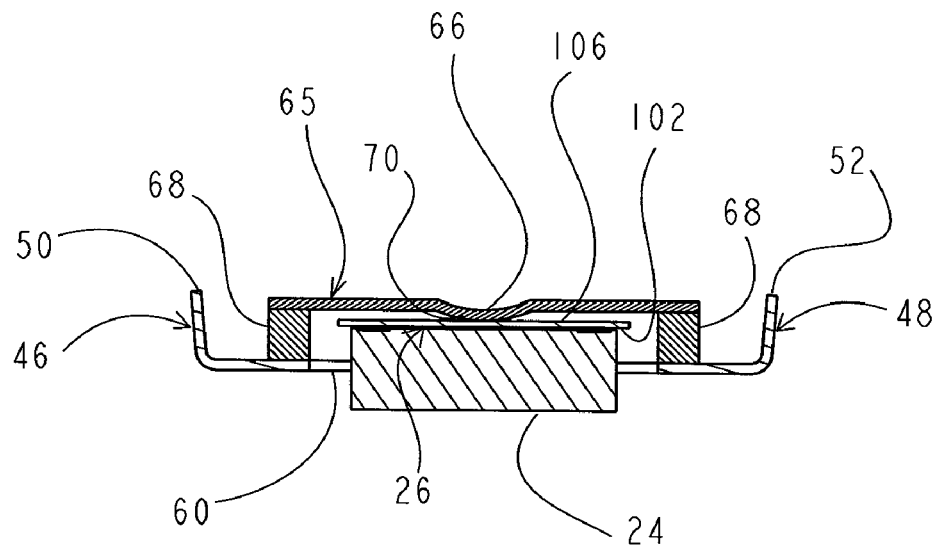

As perhaps best seen in the cross-sectional view of FIG. 2E, the slider receiving region 26 is positioned between the stiffening rails 46, 48. Portions of the mounting arms 94, 98 extend through the offset aperture 60 such that the slider receiving region 26 is located within the Z-height dimension of the load beam 20. Thus, the head slider 24, when mounted on the slider receiving surface 102 as in the illustrated embodiment, is at least partially located within the Z-height dimension of the load beam 20. As further shown, the distal portions of the leads 110, are also formed to extend into the offset aperture 60 such that the lead contact pads 114 are located within the Z-height dimension. Additionally, in the assembled disk drive head suspension 10, the load point member 66 of the load point structure 64 is positioned over the slider receiving region 26, and the load point bearing surface 106 of the slider receiving member 26 is in contact and engaged with the dimple 70 on the load point member 66.

The load point structure 64 thus restrains deflection of the slider receiving region 26 (and thus the slider 24) under load. Additionally, the dimple 70 separates the slider receiving region 26 and the load point member 66, and provides a pivot point about which the slider 24 can pitch and roll in response to aerodynamic forces imposed by wind currents generated by the spinning magnetic disk of the disk drive. The limiter 72 operates to engage and limit the amount of deflection of the slider receiving region 26 (and in turn, the slider 24).

The overall height of the head suspension 10 is minimized by virtue of the offset aperture 60 and the offset structures (e.g., the offset member 68 of the load point structure 64 and the mounting arms 94, 98 of the flexure 22), which locate the slider receiving region 26 within the Z-height dimension Z of the load beam 20. This overall height is advantageously smaller as compared to conventional head suspensions in which a slider receiving member and slider are located below a surface of the load beam (and thus outside the Z-height dimension).

The load beam 20 and flexure 22 can be made from conventional materials. In one embodiment, the load beam 20 is made from stainless steel, and its lateral edges are bent to form the stiffening rails 46 and 48. In one embodiment, the offset member 68 of the load point structure 64 is a dielectric material (e.g., polyimide), and the load point member 66 is stainless steel. In one embodiment, the flexure 22, and in particular, the slider mounting region 26, the base portion 76, the flexure arms 80, 84, the cross member 88, and the mounting arms 94, 98 are stainless steel. The leads 110 can also be of conventional design and construction, and thus can be made from any electrically conductive material (e.g., copper) typically used for integrated lead flexures. Additionally, in one embodiment, a layer of dielectric material (e.g., polyimide) is typically provided between the conductive leads and the structural portions (i.e., the flexure arms 80, 84 and cross member 88) of the flexure 22 when such portions are made from an electrically conductive material such as stainless steel.

Figure 2F:
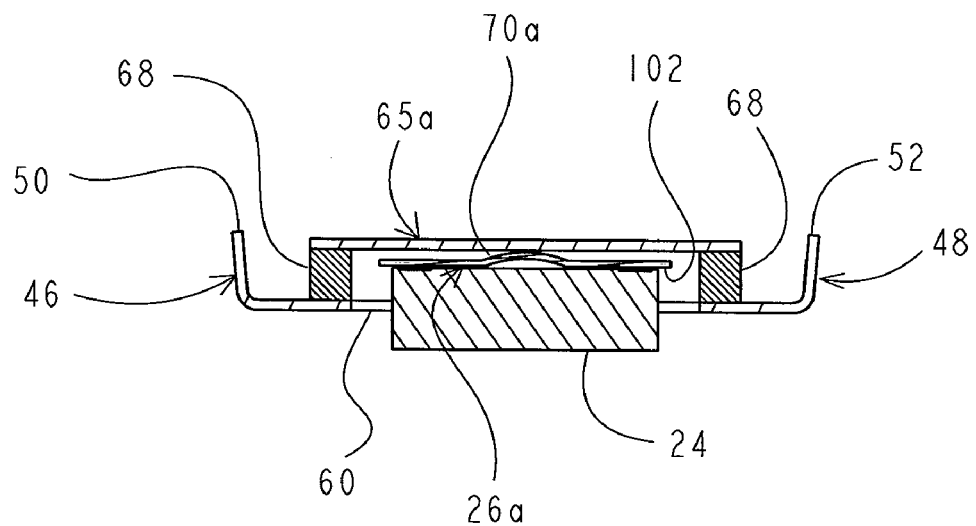
FIG. 2F is a cross-sectional view of an alternative load point structure for the disk drive head suspension of FIGS. 1 and 2A-2E.

FIG. 2F is a cross sectional view taken from the same line as the view of FIG. 2E, showing an alternative embodiment of a load point structure for the head suspension 10. In the embodiment illustrated in FIG. 2F, the load point structure includes a load point pad 65a, and a dimple 70a located on a slider receiving region 26a. As illustrated, the dimple 70a contacts and engages the load point pad 65a. It will be appreciated that the head suspension incorporating the load point structure of FIG. 2F is in other respects similar or identical in design and operation to the embodiment illustrated in FIGS. 1 and 2A-2E.

Figure 3A:
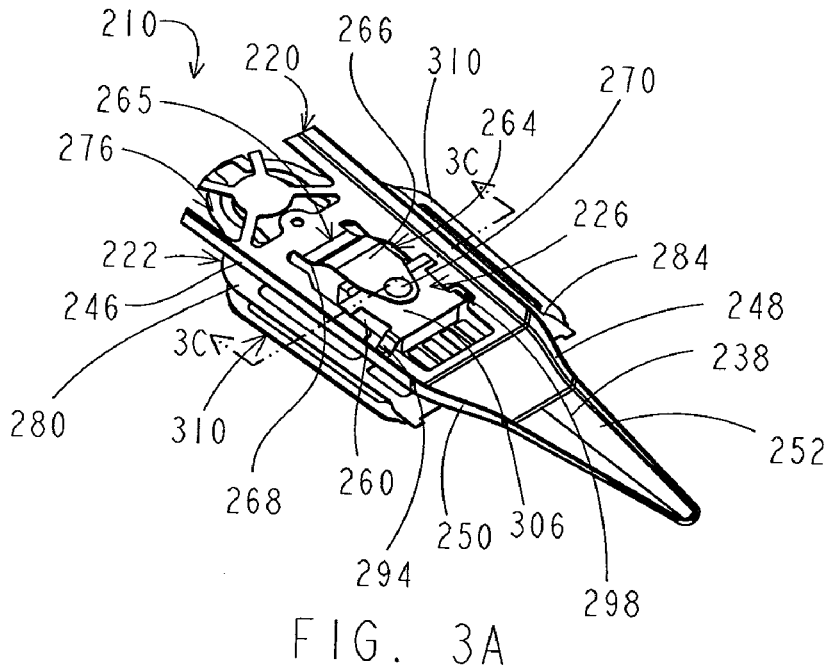
FIGS. 3A-3C illustrate a portion of a disk drive head suspension according to another embodiment of the present invention.
Figure 3B:
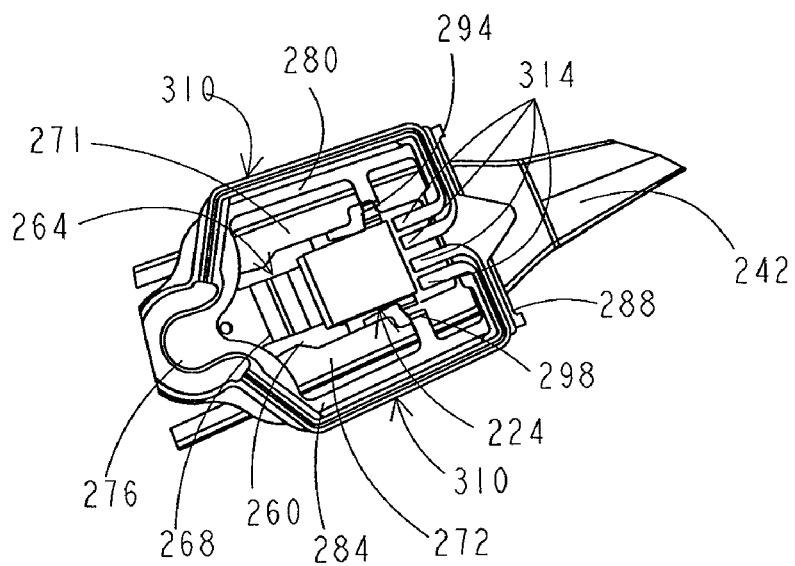
Figure 3C:
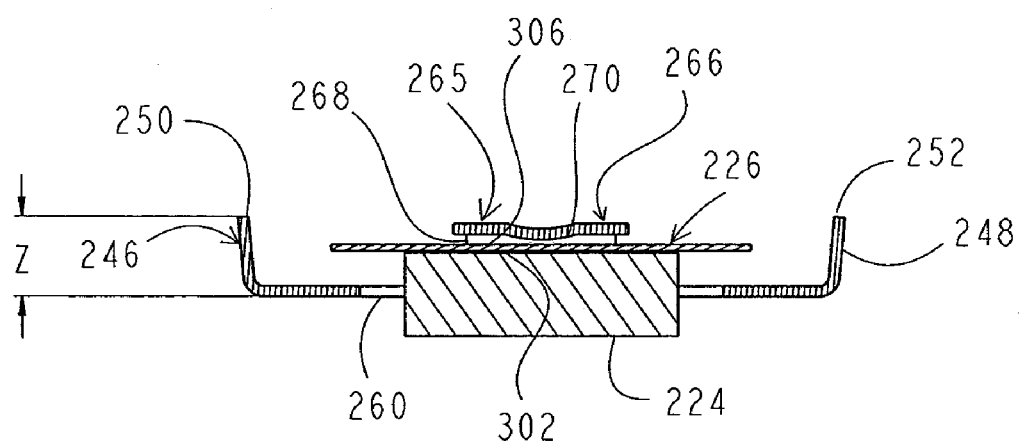

FIGS. 3A-3C illustrate a distal portion of a disk drive head suspension 210 according to another embodiment of the present invention. As shown in FIGS. 3A-3C, the head suspension 210 includes a load beam 220 and a flexure 222 mounted to the load beam 220. A head slider 224 is mounted to a slider receiving region 226 of the flexure 222. As with the head suspension 10 described above, the head suspension 210 has a reduced overall height as compared to conventional disk drive head suspensions.

The load beam 220 has a first side 238, a second side 242, and a pair of longitudinal stiffening rails 246, 248 extending generally orthogonally from the first side 238 terminating in free end edges 250, 252. Like the stiffening rails 46, 48 of the load beam 20 described above, the height of the stiffening rails 246, 248 defines a Z-height dimension Z of the load beam 220.

As shown, the load beam 220 further includes an offset aperture 260 through the first and second sides 238, 242. A load point structure 264 is positioned over the offset aperture 260, and includes a load point pad 265 positioned between the stiffening rails 246, 248 within the Z-height dimension. The load point pad 265 includes a load point member 266, which is offset from the first side 238 by an offset member 268 connecting the load point member 266 to the load beam 220. The load point structure 264 includes a load point, which in the illustrated embodiment is provided by a dimple 270 on the load point member 266 for pivotally supporting the slider receiving region 226 of the flexure 222. As further shown, the load beam 220 includes limiter tabs 271, 272 projecting partially into the offset aperture 260.

The flexure 222 includes a relatively rigid base portion 276 for mounting the flexure 222 to the second side 242 of the load beam 220, a pair of laterally spaced flexure arms 280, 284 extending distally from the base portion 276, and a cross member 288 extending between the flexure arms 280, 284 at a distal end of the flexure 222. The slider receiving region 226 is positioned between and supported from the flexure arms 280, 284 by an offset structure, which in the illustrated embodiment is a pair of mounting arms 294, 298 extending from the flexure arms 280, 284, respectively, to the slider receiving region 226. As shown, portions of the mounting arms 294, 298 are bent so as to position the slider receiving region 226 out of the general plane formed by the flexure arms 280, 284 and cross member 288. As further shown, the slider receiving region 226 includes a load point bearing surface 306 opposite the slider receiving surface 302 for engaging with the dimple 270 of the load point structure 264.

In the illustrated embodiment, the flexure 222 further includes a plurality of integrated leads 310 terminating in lead contact pads 314 positioned generally adjacent the slider receiving region 226. The leads 310 are substantially similar in design and function to the leads 110 of the flexure 22 described above, and can thus be of conventional design and structure. Furthermore, it will be appreciated that the flexure 222 in general can be made of conventional materials and processes used in integrated lead flexures, including those described above with respect to the flexure 22.

In the assembled disk drive head suspension 210, the base portion 276 of the flexure 222 is mounted to the second side 242 of the load beam 220 using any known method (e.g., soldering, spot welding) for attaching a flexure to a load beam. The head slider 224 is mounted on the slider receiving region 226, with terminal pads (not shown) of the slider 224 electrically coupled to respective lead contact pads 314. The slider receiving region 226 is positioned between the stiffening rails 246, 248. Portions of the mounting arms 294, 298 extend through the offset aperture 260 such that the slider receiving region 226 is located within the Z-height dimension of the load beam 220. Thus, the head slider 224, when mounted on the slider receiving member 226 as in the illustrated embodiment, is at least partially located within the Z-height dimension of the load beam 220. Additionally, in the assembled disk drive head suspension 210, the load point member 266 of the load point structure 264 is positioned over the slider receiving region 226, and the load point bearing surface 306 of the slider receiving member 226 is in contact and engaged with the dimple 270 on the load point member 266.

The load point structure 264 thus restrains deflection of the slider receiving region 226 (and thus the slider 224) under load. Additionally, the dimple 270 separates the slider receiving region 226 and the load point member 266, thus providing a pivot point about which the slider 224 can pitch and roll in response to aerodynamic forces imposed by wind currents generated by the spinning magnetic disk of the disk drive. The limiter tabs 271, 272 are configured to engage tabs that extend transversely from the slider receiving region 226, thus limiting the amount of deflection of the slider receiving region 226 (and in turn, the slider 224).

As with the head suspension 10 described above, the overall height of the head suspension 210 is minimized by virtue of the offset aperture 260 and the offset structures (e.g., the offset member 268 of the load point structure 264 and the mounting arms 294, 298 of the flexure 222), which are designed to locate the slider receiving region 226 within the Z-height dimension Z of the load beam 220. This overall height is advantageously smaller as compared to conventional head suspensions in which a slider receiving member and slider are located below a surface of the load beam (and thus outside the Z-height dimension).

In the illustrated embodiment, the load point structure 264 (i.e., the load point pad 265 including the load point member 266 and the offset member 268) are integrally formed from the same material (e.g., stainless steel) as the load beam 220 in general. For example, the offset member 268 and load point member 266 may initially be formed in the same general plane as the load beam 220, and one or more bending operations may be performed on the offset member 268 offset the load point member 266 from the major planar surface to which the flexure 222 is mounted and from which the stiffening rails 246, 248 extend. In other embodiments, the load point structure 264 can be formed as a separate component and attached (e.g., welded) to the load beam 220. In still other embodiments, the load point member 266 and the offset member 268 can be separate structures that are joined using known processes and techniques (e.g., welding).

Figure 4A:
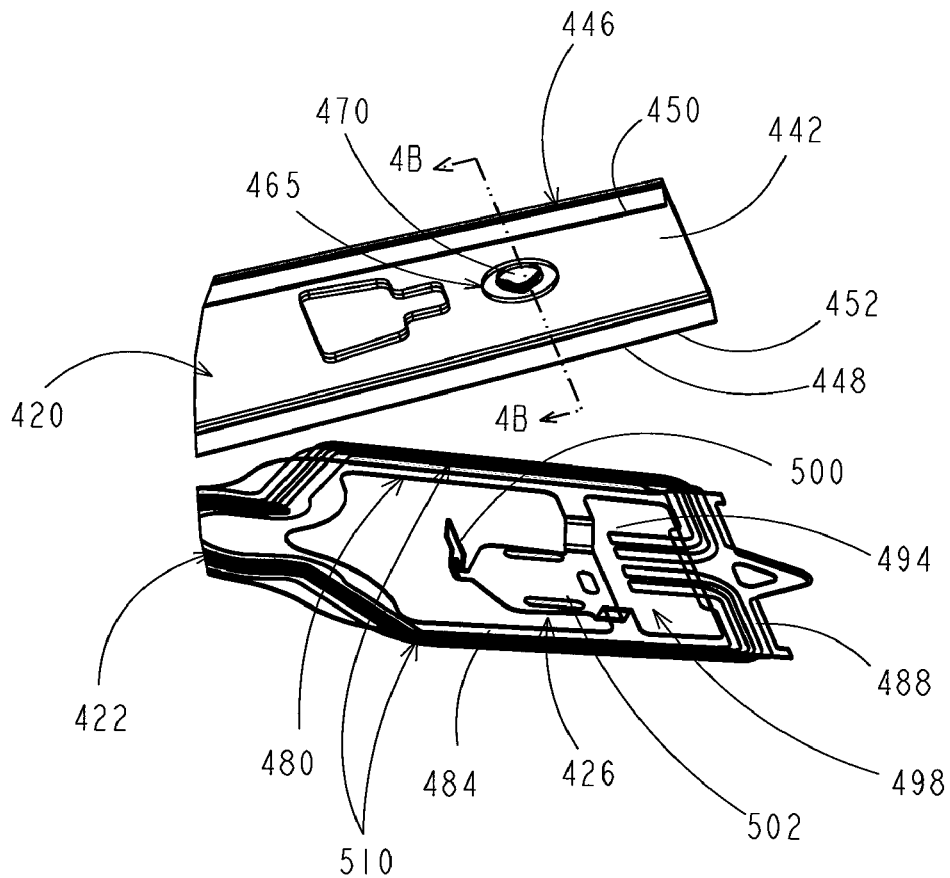
FIG. 4A is a perspective view of portions of a laminate load beam and flexure for use in a disk drive head suspension according to another embodiment of the present invention.
Figure 4B:
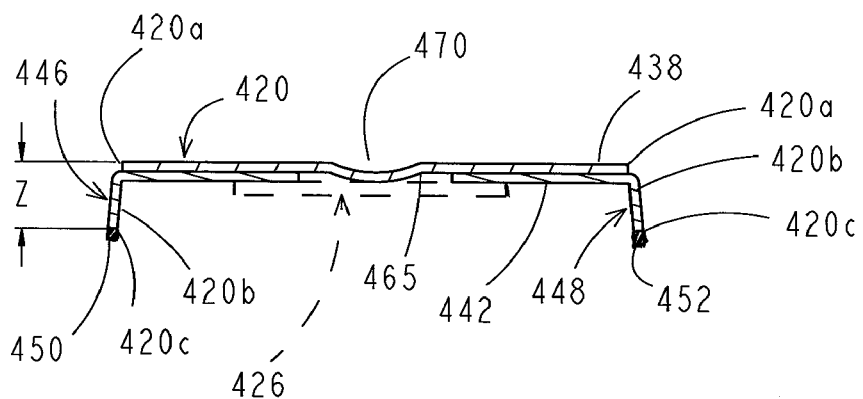
FIG. 4B is a partial cross-sectional view of a portion of the load beam shown in FIG. 4A.

FIG. 4A is a perspective view of distal portions of a laminate load beam 420 and a flexure 422 including a slider receiving region 426 for use in a head suspension assembly according to another embodiment of the present invention. FIG. 4B is a partial cross sectional view of a portion of the distal portion of the laminate load beam 420. The laminate load beam 420 has a first side 438 and a second side 442, and includes a pair of stiffening rails 446, 448 extending from the second side 442. As shown, the stiffening rails 446, 448 include free end edges 450, 452, respectively. In the illustrated embodiment, the load beam 420 is formed from a multi-layer laminate structure and includes a first layer 420a, an intermediate layer 420b, and a third layer 420c.

As can be seen in FIGS. 4A and 4B, the stiffening rails 446 and 448 each are formed from the third layer 420c and the intermediate layer 420b. Thus, it will be appreciated that the stiffening rails 446, 448 are, in the illustrated embodiment, formed by partially removing (e.g., by etching) portions of the intermediate and third layers 420b, 420c of a three-layer laminate sheet. As further shown, in the illustrated embodiment, a relatively thin portion of the intermediate layer 420b remains between the stiffening rails 446, 448. Additionally, this thin portion of the intermediate layer 420b is selectively removed (e.g., by etching) to expose a load point pad 465 of the first layer 420a. As shown in FIG. 4B, the load beam 420 is characterized by a Z-height dimension Z corresponding to the height of the stiffening rails 446, 448.

In the illustrated embodiment, the load point pad 465 includes a dimple 470 extending into the Z-height dimension Z from first layer 420a. The dimple 470 can be formed in the first layer 420a after the second layer 420b is etched to expose the load point pad 465. By way of example, with the load point pad 465 exposed, the dimple 470 can be formed into the first layer 420a by a punch or by using a metal deposition process.

As further shown, the flexure 422 includes a pair of laterally spaced flexure arms 480, 484, and a cross member 488 extending between the flexure arms 480, 484 at a distal end of the flexure 422. The flexure arms 480, 484 extend distally from a flexure base portion (not shown) which is relatively rigid for mounting the flexure 422 to the load beam 420, such as in the manner described above with respect to the head suspensions 10, 210. The slider receiving region 426 is positioned between and supported from the flexure arms 480, 484 by a pair of mounting arms 494, 498 extending from the flexure arms 480, 484, respectively, to the slider receiving region 426. The slider receiving region 426 includes a limiter member 500, a slider receiving surface 502, and a load point bearing surface opposite the slider receiving surface 502 for engaging with the dimple 470 of the load point pad 465. The flexure 422 further includes a plurality of integrated leads 510 which, like the leads 110, 310 of the flexure 22, 222 respectively described above, can be of conventional design and construction for leads in integrated lead flexures. In other embodiments, the limiter member 500 may be omitted, or alternatively, a different limiter design may be incorporated.

The dimple 470 provides a load point that is substantially similar or identical to the dimples 70, 270 described above in connection with the load beams 20 and 220, respectively. That is, the load point pad 465 and dimple 470 operate to restrain deflection of the slider receiving region 426 of a flexure 422 under load. Additionally, the dimple 470 separates the slider receiving region 426 and the load point pad 465, thus providing a pivot point about which the slider receiving region 426 can pitch and roll in response to aerodynamic forces imposed by wind currents generated by the spinning magnetic disk of the disk drive.

Additionally, as with the load beams 20 and 220 described above, the load beam 420 permits a slider to be mounted within the Z-height dimension of the load beam 420. Thus, the overall height of a disk drive head suspension utilizing the laminated load beam 420 can be minimized as compared to conventional head suspensions in which the slider is located wholly outside the Z-height dimension.

In one embodiment, the first and third layers 420a, 420c are made of the same material, for example, stainless steel, and the intermediate layer 420b can be a dielectric material such as polyimide. In other embodiments, the first and third layers are made of different materials. The flexure 422 and its constituent components can be made of conventional materials including, for example, those described above with respect to the flexure 22 of the head suspension 10.

Figure 5A:
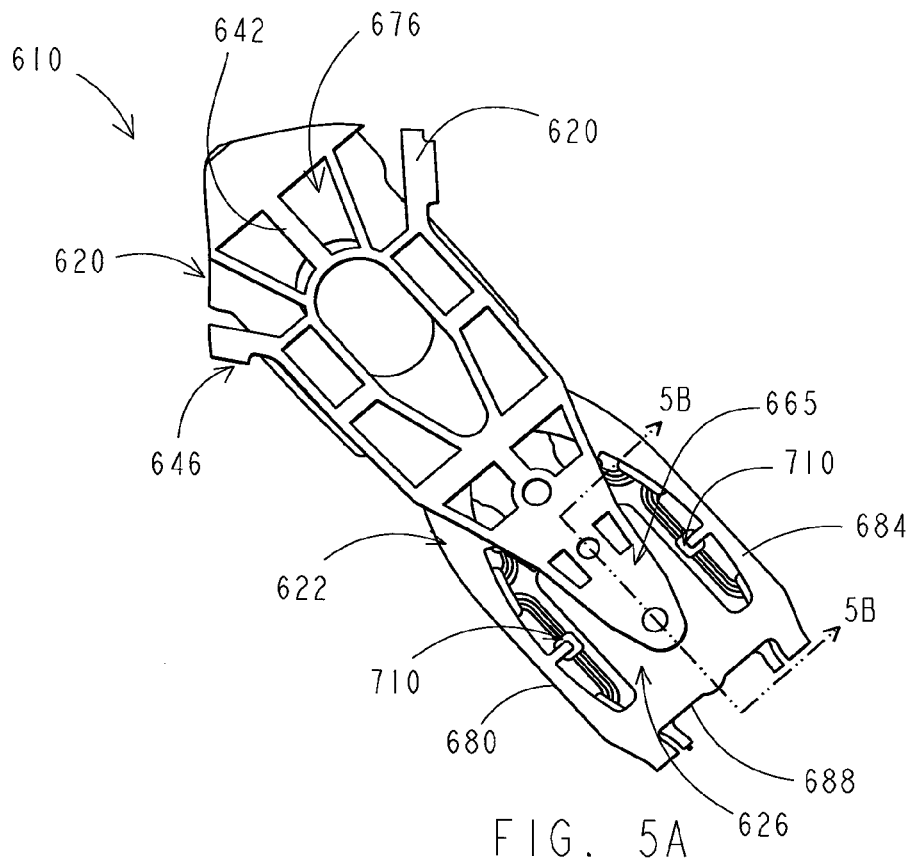
FIG. 5A is a perspective view of a portion of a disk drive head suspension including an alternative laminate load beam according to another embodiment of the present invention.
Figure 5B:
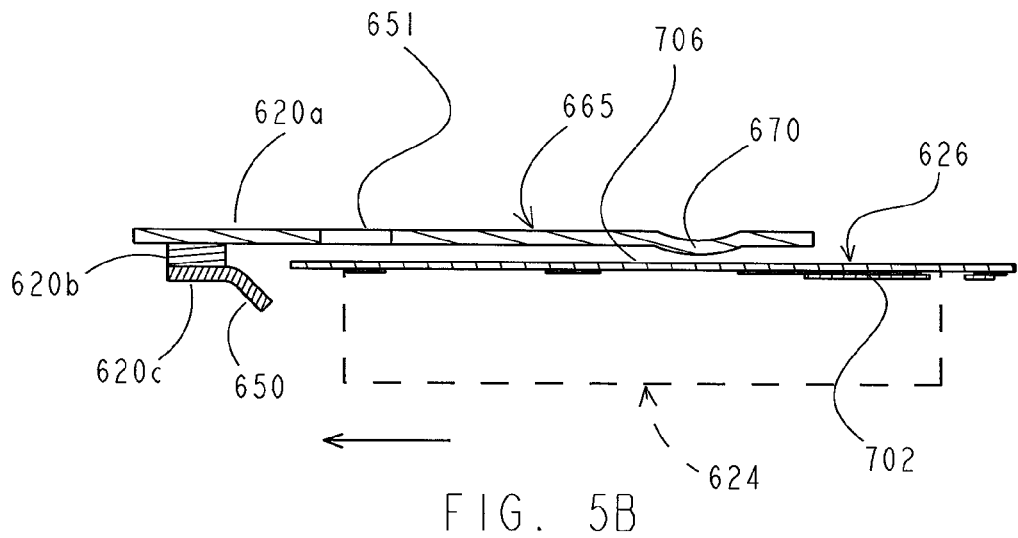
FIG. 5B is a partial cross-sectional view of a portion of the disk drive head suspension shown in FIG. 5A.

FIG. 5A is a perspective view of a portion of a disk drive head suspension 610 according to another embodiment of the present invention. FIG. 5B is a partial cross-sectional view of the head suspension 610. As shown in FIGS. 5A-5B, the suspension 610 includes a laminate load beam 620 and a flexure 622 mounted to the load beam 620. As further shown, the flexure 622 includes a slider receiving region 626 to which a head slider 624 (shown in phantom lines in FIG. 5B) can be mounted. The load beam 620 has a three-layer laminate construction similar to that of the load beam 420 described above. As perhaps best seen in FIG. 5B, the load beam 620 includes first, intermediate, and third layers 620a, 620b, and 620c. As with the load beam 420, the intermediate and third layers 620b, 620c of the laminate have been partially removed (e.g., by etching) to form stiffening rails extending from a side of the load beam 620, and thus, the combined thicknesses of the layers 620a, 620b, and 620c define a Z-height dimension for the load head suspension 610 (see FIG. 5B). In the illustrated embodiment, only a single stiffening rail 646 is shown, although it is to be understood that a second stiffening rail is further provided on the opposite lateral side of the load beam 620.

As further shown in the cross-sectional view of FIG. 5B, a limiter tab 650 is formed in the third layer 620c in a portion of the intermediate and third layers 620b, 620c remaining (i.e., un-etched) at a location proximal to the location of the free end of the slider receiving region 626 of the flexure 622. As shown, the first layer 620a also includes an aperture 651 located above the limiter tab 650 for facilitating forming the limiter tab 650 prior to mounting the flexure 622 to the load beam 620. Additionally, the first layer 620a of the load beam 620 includes a load point pad 665 having a dimple 670, both of which operate in substantially the same manner as or identical to, for example, the load point pad 465 and dimple 470 of the load beam 420 described above.

The flexure 622 includes a base portion 676, for mounting the flexure 622 to the load beam 620, a pair of laterally spaced flexure arms 680, 684 extending distally from the base portion 676, and a cross member 688 extending between the flexure arms 680, 684 at a distal end of the flexure 622. The slider receiving region 626 is positioned between the flexure arms 680, 684 and supported from the cross member 688. The slider receiving region 626 includes a slider receiving surface 702 and a load point bearing surface 706 opposite the slider receiving surface 702 for engaging with the dimple 670 of the load point pad 665. The flexure 622 further includes a plurality of integrated leads 710 which, like the leads 110, 310 of the flexures 22, 222 respectively described above, can be of conventional design and construction.

In the assembled disk drive head suspension 610, the base portion 676 of the flexure 622 is mounted to the load beam 620. The head slider 624 is mounted on the slider receiving surface 702 of the slider receiving region 626, with terminal pads (not shown) of the slider 624 electrically coupled to respective lead contact pads (not shown). The slider receiving region 626 is positioned between the stiffening rails such that the slider receiving region 626 is located within the Z-height dimension of the load beam 620. Thus, the head slider, when mounted on the slider receiving surface 702 can be at least partially located within the Z-height dimension of the load beam 620. Additionally, in the assembled disk drive head suspension 610, the load point pad 665 is positioned over the slider receiving region 626, and the load point bearing surface 706 of the slider receiving member 626 is in contact and engaged with the dimple 670 of the load point pad 665.

Thus, as with the embodiments described above, the load point pad 665 and the dimple 670 restrain deflection of the slider receiving region 626 of the flexure 622 under load. Additionally, the dimple 670 separates the slider receiving region 626 and the load point pad 665, thus providing a pivot point about which the slider receiving region 626 can pitch and roll in response to aerodynamic forces imposed by wind currents generated by the spinning magnetic disk of the disk drive. Still additionally, as with the load beams described above, the load beam 620 is designed to permit the slider 624 to be mounted within the Z-height dimension of the load beam 620 (defined by the height of the stiffening rails), thus minimizing the overall height of the disk drive head suspension 610 as compared to conventional head suspensions in which the slider is located wholly outside the Z-height dimension.

The functionality of the formed limiter tab 650 can be seen from FIG. 5B. The limiter tab 650 limits longitudinal deflection of the slider receiving region 626 under load. As is apparent from FIG. 5B, as the slider 624 is displaced longitudinally in a proximal direction (as indicated by the arrow in FIG. 5B) relative to the load beam 620, the slider receiving member 626 region will contact the limiter tab 650, thus preventing further longitudinal displacement and increasing the longitudinal stiffness of the flexure 622. The aperture 651 in the first layer 620a of the laminate load beam 620 can provide access to the limiter 650 to form it as shown in FIG. 5B prior to mounting the flexure 622 to the load beam 620.

It will be appreciated that in some embodiments, the limiter 650 can be omitted. Alternatively, in other embodiments, different structures can be used to limit displacement of the flexure under load.

The materials of the load beam 620 and flexure 622 can be substantially the same as or identical to those described above with respect to the load beam and flexure 420, 422.

With either of the head suspensions 410 and 610 previously described, the mounting or base portion of the flexure can be mounted to either the upper or lower layer of the respective laminate load beam 420, 620. For example, the flexures can be attached to a portion (e.g., mounting arms) of the lower layer, stainless steel layer (i.e., 420c, 620c) that are left intact (i.e., not etched away) for the purpose of mounting the respective flexure. In other embodiments, the flexure can be mounted to the upper layer (i.e., 420a, 620a). The flexures of any of the embodiments of the invention can be mounted to the respective load beams using any known method (e.g., soldering, spot welding) for attaching a flexure to a load beam.

In the illustrated embodiments described above, the dimple is shown located on the load point pad/member which is either attached to or integral to the respective load beam. It will be appreciated, however, that in other embodiments, the dimple can be on the surface of the slider receiving region opposite the slider receiving surface. In the latter embodiments, the dimple engages with and bears upon the load point pad/member of the load beam, and provides the same functionality as in the illustrated embodiments in which the dimple is on the load beam and engages with a surface of the slider receiving region of the flexure. In still other embodiments, both the slider receiving region of the flexure and the load point pad/member of the load beam can include a dimple.

The dimple in the various embodiments of the invention can be provided using any known methods. For example, in one embodiment, the dimple may be formed (e.g., using a punch) into the load point pad/member of the load beam and/or the slider receiving region of the flexure. In other exemplary embodiments, the dimple may be formed using a metal deposition process. Other methods for forming the dimple will be appreciated by those skilled in the art.

The offset dimple design of the present invention has many advantages over conventional head suspension designs in which the head slider is positioned below a lower surface of the load beam. In particular, as explained above, offsetting the slider receiving region of the flexure, and thus the slider itself, within the Z-height dimension of the load beam allows the overall height of the head suspension assembly to be reduced.

Alternatively, in some circumstances, it may be desirable to increase the stiffness of the head suspension. It will be appreciated that the stiffness of the head suspension can be increased by increasing the height of the stiffening rails. By offsetting the slider receiving region of the flexure into the Z-height dimension of the load beam according to present invention, the heights of the stiffening rails can be increased by an amount commensurate with the amount of offset of the slider receiving region without affecting the overall height of the head suspension. Thus, the offset dimple head suspension of the present invention advantageously facilitates relatively high load beam stiffnesses (i.e., by increasing stiffening rail height) without commensurately increasing the overall height of the suspension assembly.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A disk drive head suspension, including:
a load beam formed from one or more layers of material and including an offset aperture;
a flexure having a slider-receiving region, the flexure mounted to the load beam with at least a portion of the slider receiving region extending into or through the offset aperture; and
a load point structure on the load beam and/or the flexure.

2. The disk drive head suspension of claim 1 wherein the flexure further includes a load beam mounting region mounted to the load beam and an offset structure for offsetting the slider-receiving region from the load beam mounting structure.

3. The disk drive head suspension of claim 2 wherein:
the load beam includes a first side, a second side opposite the first side, and stiffening rails extending from the first side; and
the load beam mounting structure is mounted to the second side of the load beam, and the slider-receiving region extends through the offset aperture and is located between the stiffening rails.

4. The disk drive head suspension of claim 3 wherein the load point structure includes:
a load point pad between the stiffening rails and over the slider-receiving region of the flexure; and
a load point on one of the load point pad or the slider-receiving region for engaging the other of the load point pad and the slider-receiving region.

5. The disk drive head suspension of claim 4 wherein the load point pad includes:
an offset member attached to the load beam; and
a load point member attached to the offset member.

6. The disk drive head suspension of claim 5 wherein the load point structure includes a dimple on the load point member.

7. The disk drive head suspension of claim 5 wherein the load point structure includes a dimple on the slider receiving region of the flexure.

8. The disk drive head suspension of claim 5 wherein the load beam and load point pad are formed from a multilayer laminated sheet of material.

9. The disk drive head suspension of claim 5 wherein the offset member is made substantially from a dielectric material.

10. The disk drive head suspension of claim 4 wherein the load point pad is formed from the same material as the load beam and includes a load point pad offset structure.

11. A load beam for a disk drive suspension, the load beam being made from one or more layers of material and including:
- a first side and a second side;
- an offset aperture through the first and second sides;
- stiffening rails extending from the first side and having free end edges, a dimension between the one or more layers and the free end edges defining a Z-height dimension; and
- a load point pad located at least partially over the offset aperture within the Z-height dimension and between the stiffening rails, and further including a load point member for engaging a slider-receiving region of a flexure.

12. The load beam of claim 11 wherein the load point member includes a dimple.

13. The load beam of claim 11 wherein the load point pad includes an offset member for offsetting the load point member from the one or more layers of material.

14. The load beam of claim 11 wherein the stiffening rails are etched from a multilayer laminate.

* * * * *

UNITED STATES PATENT AND TRADEMARK OFFICE
CERTIFICATE OF CORRECTION

PATENT NO.       : 7,606,002 B1                          Page 1 of 1
APPLICATION NO.  : 11/441966
DATED            : October 20, 2009
INVENTOR(S)      : Berscheit et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Fifth Day of October, 2010

David J. Kappos
*Director of the United States Patent and Trademark Office*